(12) United States Patent
Sung et al.

(10) Patent No.: US 7,050,466 B1
(45) Date of Patent: May 23, 2006

(54) APPARATUS AND METHOD FOR ACQUIRING MULTI-USER SIGNAL SYNCHRONIZATION IN CODE DIVISION MULTIPLE ACCESS SYSTEM

(75) Inventors: Sang-Hun Sung, Seoul (KR); Cheol-Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 09/678,836

(22) Filed: Oct. 4, 2000

(30) Foreign Application Priority Data

Oct. 5, 1999 (KR) ................ 1999-42777

(51) Int. Cl.
*H04J 3/06* (2006.01)
(52) U.S. Cl. ...................... 370/515; 370/503
(58) Field of Classification Search ................ 370/515, 370/320, 342, 335, 479, 491, 497, 500, 503, 370/514; 375/143–145, 148–149, 152
See application file for complete search history.

(56) References Cited

U.S. PATENT DOCUMENTS

| | | | | |
|---|---|---|---|---|
| 6,141,337 A * | 10/2000 | Uta et al. | .............. | 370/350 |
| 6,259,687 B1 * | 7/2001 | Lomp et al. | .............. | 370/342 |
| 6,275,545 B1 * | 8/2001 | Suzuki | .............. | 375/343 |
| 6,289,041 B1 * | 9/2001 | Krasner | .............. | 375/152 |
| 6,343,094 B1 * | 1/2002 | Yamamoto | .............. | 375/152 |
| 6,385,232 B1 * | 5/2002 | Terashima | .............. | 375/149 |
| 6,470,000 B1 * | 10/2002 | Burns et al. | .............. | 370/342 |
| 6,516,022 B1 * | 2/2003 | Ozluturk et al. | .............. | 375/152 |
| 6,560,272 B1 * | 5/2003 | Komatsu | .............. | 375/147 |
| 6,570,865 B1 * | 5/2003 | Masui et al. | .............. | 370/342 |
| 6,611,512 B1 * | 8/2003 | Burns | .............. | 370/342 |
| 6,658,042 B1 * | 12/2003 | Tran et al. | .............. | 375/130 |

FOREIGN PATENT DOCUMENTS

| | | |
|---|---|---|
| CN | 1125026 A | 6/1996 |
| CN | 1208515 A | 2/1999 |
| WO | WO 94/29985 | 12/1994 |
| WO | WO 97/28612 | 8/1997 |

* cited by examiner

*Primary Examiner*—Ajit Patel
*Assistant Examiner*—Kevin Mew
(74) *Attorney, Agent, or Firm*—Fleshner & Kim, LLP

(57) ABSTRACT

An apparatus and method for acquiring multi-user signal synchronization in a CDMA system is disclosed. In a preferred embodiment, pilot signals are generated using different PN seeds and the generated pilot signals are aligned to thus be transmitted within a predetermined time from the synchronization point of time in a plurality of CDMA transmitters. A tap coefficient is varied at a prescribed interval in a frame period using a plurality of PN seeds used in the plurality of CDMA transmitters and synchronization of signals transmitted from the plurality of CDMA transmitters is acquired. The construction of the apparatus is thus simplified and multi-user signal synchronization is acquired within one frame time, which is the shortest time.

19 Claims, 3 Drawing Sheets

APPARATUS AND METHOD FOR ACQUIRING MULTI-USER SIGNAL SYNCHRONIZATION IN CODE DIVISION MULTIPLE ACCESS SYSTEM

BACKGROUND OF THE INVENTION

1. Field of the Invention

The present invention relates to a Code Division Multiple Access (CDMA) system, and more particularly, to an apparatus and method for acquiring multi-user signal synchronization in a CDMA system.

2. Background of the Related Art

Generally, a receiver of a base station or terminal using CDMA mode is designed to correlate with codes for asynchronous signal transmission. Such a CDMA system employs a matched filter receiver, and requires strict power control in order to avoid potential problems, such as interference due to multiple users in the same cell.

A matched filter is a linear filter. Thus, the difference between the square mean of a signal element and the square mean of a noise element is maximized at a certain point of an output, with respect to an input in which a correlation noise is overlapped with a desired signal element. In addition, a seed is a constant used as an initial value of a pseudo random number generator. That means that the seed of an initial random number generates the next result, and the generated result acts as a seed.

FIG. 1 shows one example of a block construction of an apparatus for acquiring multi-user signal synchronization in a CDMA system in the related art.

As illustrated therein, the apparatus includes a plurality of user units 1–N for transmitting pilot signals using different Pseudo Noise (PN) seeds. It also includes a plurality of matched filters 11~(10+N) for acquiring a signal synchronization of each of the user units 1–N using a coefficient generated with a PN seed that is identical to the coefficient of each user unit 1–N. Finally, it includes a plurality of demodulators 21~(20+N) for demodulating signals of the corresponding user units according to the synchronizations acquired from the corresponding matched filters 11~(10+N).

In operation, when N number of users are present, the N number of users each have a different PN seed. Thus, the N number of user units 1–N transmit pilot signals using the associated PN seed. A CDMA receiver has N number of matched filters 11~(10+N), which correspond to the N number of user units 1–N. The corresponding matched filter receives pilot signals from each of the user units 1–N.

That is, the N number of matched filters 11~(10+N) each have the same PN seed as that used in corresponding ones of the N number of user units 1–N. When a pilot signal is received from a given user unit 1–N the matched filter corresponding to the user unit's PN seed is operated, thereby acquiring synchronization.

The related art system has many problems. For example, when there are many users, the apparatus for acquiring multi-user signal synchronization in a CDMA system in the related art requires an increased number of matched filters in proportion to the number of users. Therefore, the problem arises that the size and volume of the CDMA receiver are increased, and the cost is also increased.

The above references are incorporated by reference herein where appropriate for appropriate teachings of additional or alternative details, features and/or technical background.

SUMMARY OF THE INVENTION

It is an object of the present invention to provide a system and method for acquiring multi-user signal synchronization in a CDMA system, which substantially obviates problems caused by disadvantages of the related art.

It is another object of the present invention to provide a system and method for acquiring multi-user signal synchronization in a CDMA system, which uses a single matched filter to generate coefficients at different PN seeds used by a plurality of different users to provide system synchronization.

It is another object of the present invention to provide a system and method for acquiring multi-user signal synchronization in a CDMA system, which can acquire the multi-user signal synchronization within one frame time.

It is another object of the present invention to provide an apparatus ad method for acquiring multi-user signal synchronization in a CDMA system which is capable of acquiring multi-user signal synchronization in one frame, by periodically updating the tap coefficient of a single matched filter using different PN seeds used by a plurality of users (multiple users).

To achieve at least these objects in whole or in parts, there is provided an apparatus for acquiring multi-user signal synchronization in a CDMA system, which includes a plurality of CDMA transmitters for generating pilot signals using different PN seeds and aligning the generated pilot signals for thereby transmitting the same within a predetermined time from the synchronization point of time; and a CDMA receiver having a single matched filter for acquiring synchronization of signals transmitted from the plurality of CDMA transmitters in one frame period by varying the tap coefficient a certain interval in the frame period, and a plurality of demodulators for demodulating signals of the plurality of CDMA transmitters each synchronized in the matched filter.

To further achieve at least these objects in whole or in parts, there is provided a method for acquiring multi-user signal synchronization in a CDMA system, which includes the step of generating pilot signals using different PN seeds in a plurality of CDMA transmitters and aligning the generated pilot signals for thereby transmitting the same within a predetermined time from the synchronization point of time; and acquiring synchronization of signals transmitted from the plurality of CDMA transmitters in one frame period by varying the tap coefficient at a certain interval in the frame period.

In addition, to achieve at least these objects in whole or in parts, there is provided a method for acquiring multi-user signal synchronization in a CDMA system, which includes a first step of storing PN seeds which are equal to PN seeds used in a plurality of CDMA transmitters; a second step of generating a tap coefficient corresponding to the plurality of stored PN seeds and updating the same at a certain interval in a frame period; and a third step of acquiring signal synchronization of the plurality of CDMA transmitters in one frame by means of matched filtering using signals from the CDMA transmitters and the updated tap coefficient.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
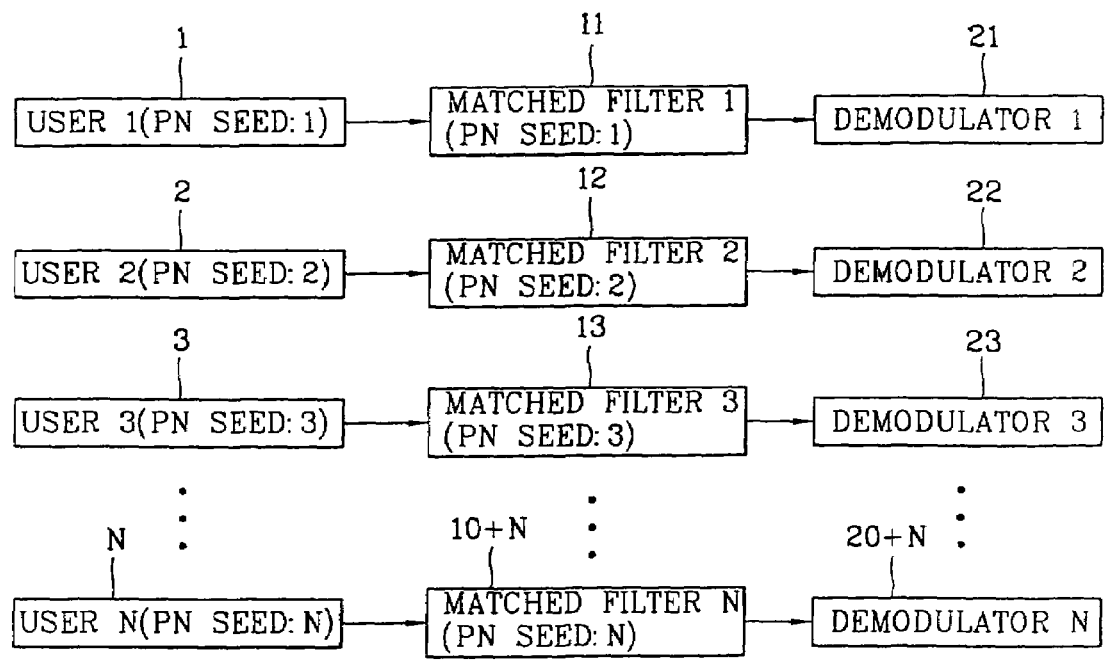
FIG. 1 is a block diagram illustrating the construction of a related art apparatus for acquiring multi-user signal synchronization in a CDMA system.
Figure 2:
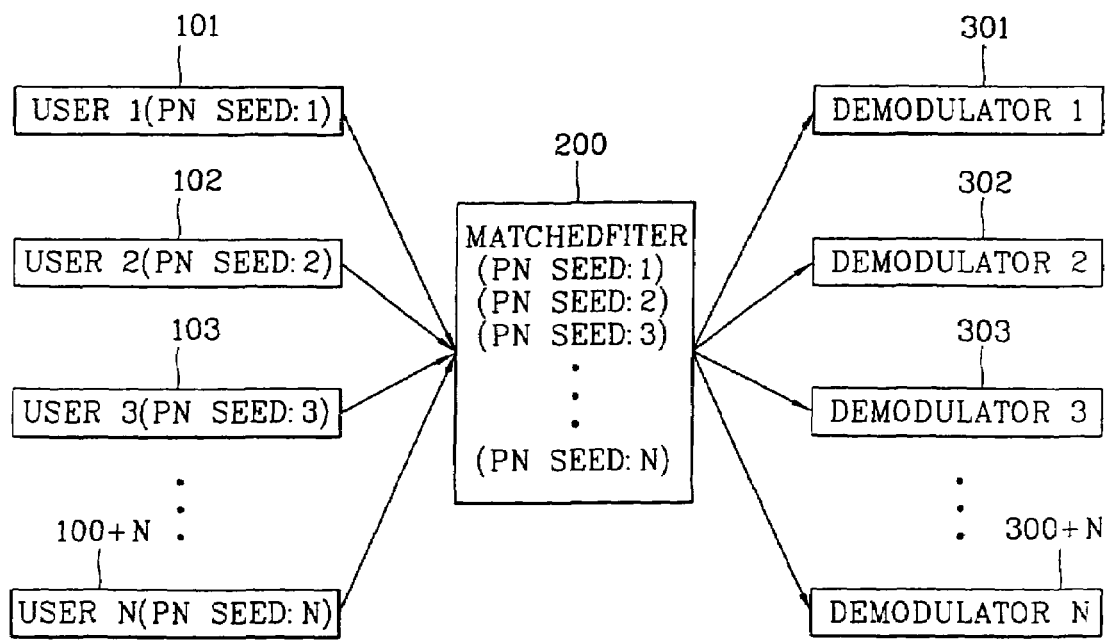
FIG. 2 is a block diagram illustrating the construction of an apparatus for acquiring multi-user signal synchronization in a CDMA system in accordance with a preferred embodiment of the present invention.
Figure 4:
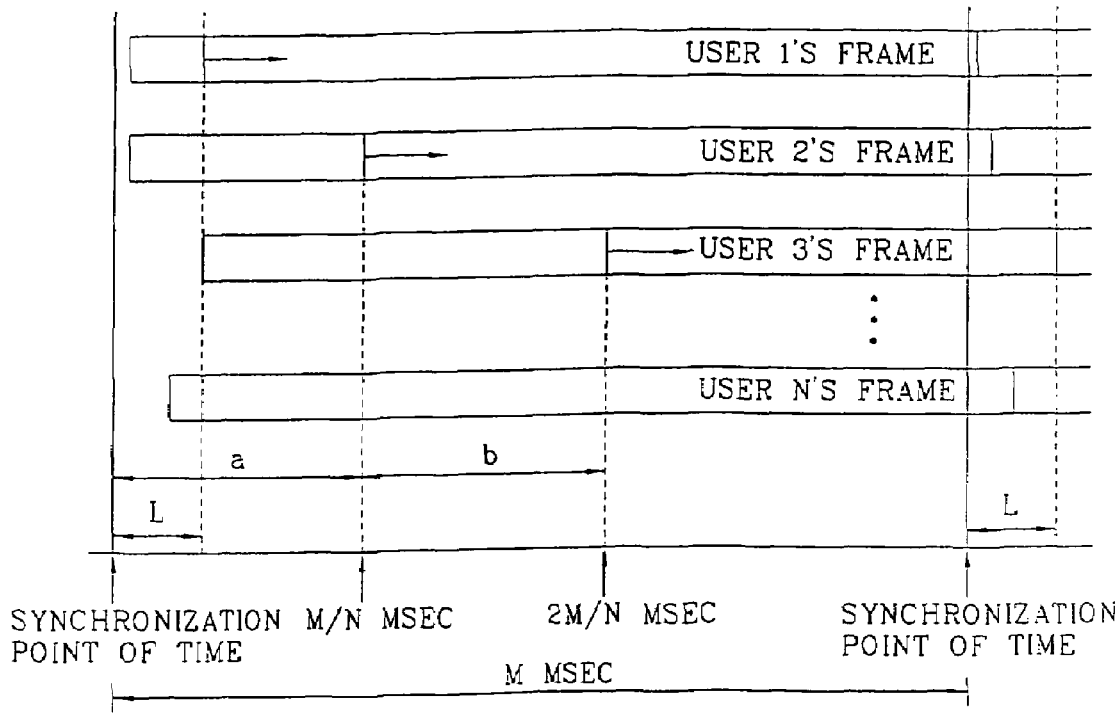
FIG. 4 is a view illustrating the structure of a frame of a multi-user signal in accordance with a preferred embodiment of the present invention.

FIG. 2 is a block diagram of a system for acquiring multi-user signal synchronization in a CDMA system in accordance with a preferred embodiment of the present invention. As illustrated therein, the apparatus includes a plurality of user units 101~(100+N) to generate pilot signals using different PN seeds. The user units 101~(100+N) align the generated pilot signals so as to transmit them within a predetermined time from a synchronization point of time (see FIG. 4). The system further includes a CDMA receiver having a matched filter 200 for acquiring synchronization of signals transmitted from the plurality of CDMA transmitters 101~(100+N) in one frame period. It does so by varying the tap coefficient at a certain interval in the frame period. Finally, the system includes a plurality of demodulators 301~(300+N) to demodulate signals of the plurality of user units 100~(100+N) synchronized in the single matched filter 200.

Figure 3:
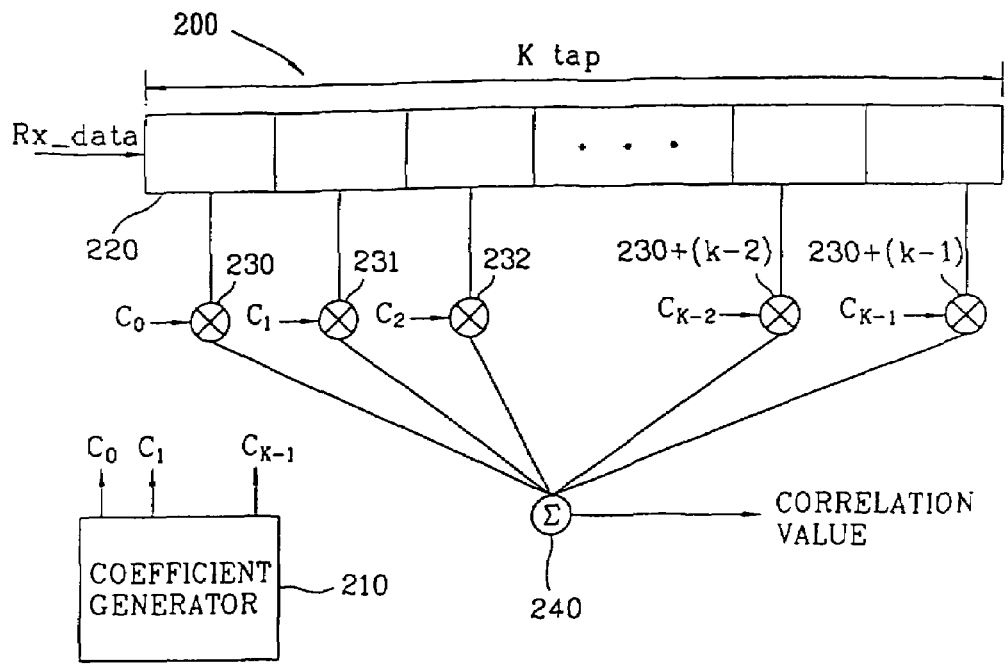
FIG. 3 is a block diagram illustrating the construction of a single matched filter of FIG. 2.

As illustrated in FIG. 3, the matched filter 200 preferably includes a plurality of taps 220 for delaying pilot signals transmitted from the plurality of user units 101~(100+N) for a period of time, and outputting the same. The matched filter also includes a coefficient generator 210 for generating a coefficient corresponding to the PN seed used in the plurality of user units 101~(100+N). The coefficient generation outputs the coefficients at certain intervals in a frame period. Next, the matched filter 200 includes a plurality of multipliers 230~(230+(K−1)) for multiplying signals outputted from the plurality of taps 200 by the corresponding one of the plurality of coefficients outputted from the coefficient generator 210 at a certain interval in a frame period. Finally, a summer 240 is included for summing the outputs of the plurality of multipliers 230~(230+(K−1)) and outputting the summed value as a correlation value.

The preferred embodiment of the apparatus and method for acquiring multi-user signal synchronization in a code division multiple access system will now be described.

A CDMA transmitter for transmitting CDMA signals is provided in both the base station and the mobile station, and a CDMA receiver for receiving CDMA signals is also provided in both the base station and the mobile station. For the purposes of this example, the mobile station transmits CDMA signals, and the base station receives them.

Initially, a plurality of CDMA transmitters, for example, a plurality of user units 101~(100+N), each generate pilot signals, preferably using different PN seeds. They next align the generated pilot signals, and preferably transmit them within a certain time period from the synchronization point of time. This time period is preferably defined in advance.

With respect to the time point of alignment of pilot signals, when there are N number of users, each user has a different PN seed. When pilot signals are transmitted using the corresponding PN seed, they are transmitted in a frame shape. One frame preferably has the length of M msec.

The reference point of time having the same length as the frame is referred to as synchronization point of time. This synchronization point of time is known to both CDMA transmitter and CDMA receiver.

The user units 101~(100+N), however, cannot precisely match the synchronization point of time due to the difference in actual performance of systems during the transmission of pilot signals. The user units thus transmit signals at a point of time deviated from the synchronization point of time. This deviated point of time is preferably within L msec from the synchronization point of time. In other words, each of the user units 100~(100+N) must align pilot signals and transmit the same within L msec from the synchronization point of time. The CDMA receiver receives these pilot signals and thereby synchronizes the system.

The time point of alignment of these pilot signals is preferably within the range of 0<L<(M/N−T), where T is the time taken to load all of the taps 220 of the matched filter with received signals. The unit of measurement for T is msec, and T should be smaller than M/N msec. In addition, M msec is the period of one frame, N is the number of the CDMA transmitters, and M/N msec is the tap coefficient updating period of the matched filter 200.

Thus, the user units 101~(100+N), having different PN seeds, align pilot signals within a certain range and transmit the same. The single matched filter 200 included in the CDMA receiver then updates the tap coefficient at a certain interval in a frame period, and acquires synchronization of signals each transmitted from the plurality of user units 101~(100+N) in one frame.

Figure 5:
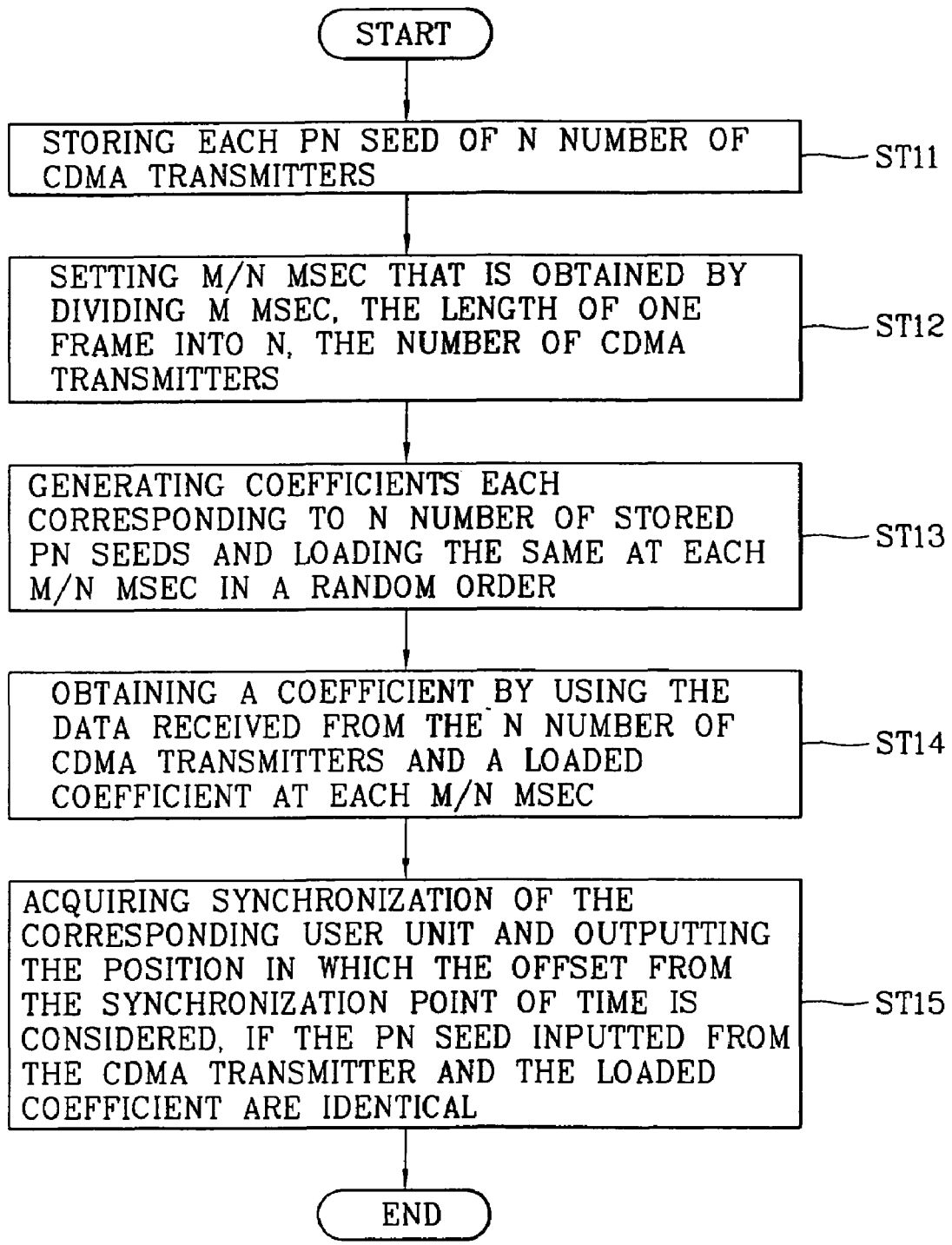
FIG. 5 is a flow chart illustrating a method for acquiring multi-user signal synchronization in a single matched filter in accordance with a preferred embodiment of the preset invention.

FIG. 5 is a flow chart showing a method for acquiring multi-user signal synchronization in this matched filter 200. As illustrated therein, the method includes the steps of storing each of the PN seeds of the plurality of user units 101~(100+N) and setting the time M/N msec that is obtained by dividing M msec, the length of one frame, into N, the number of user units (101~100+N) as a tap coefficient updating time, as shown in steps ST11 and ST12. Next, coefficients corresponding to the plurality of stored PN seeds are generated and loaded at each M/N msec in a random order, as shown in step ST13.

Synchronization of the corresponding user unit is then acquired. If the data from one user unit among data received from N number of user units 101~(100+N) and the loaded coefficient are identical, the synchronization offset position is set and outputted to the corresponding demodulator 301~(300+N), as shown in steps ST14 and ST15.

The method for acquiring multi-user signal synchronization in a single matched filter 200 as recited above will now be described. First, a plurality of PN seeds equal the plurality of PN seeds of user units 101~(100+N), is stored in a coefficient updating device 210 of the matched filter 200 as shown in step ST11. Next, a tap coefficient updating time is set, as shown in step ST12. The tap coefficient time is the time MIN msec, and is obtained by dividing M msec, the length of one frame, into N, the number of user units (101~100+N).

When the synchronization point of time begins, the coefficient corresponding to one of the plurality of stored PN seeds is loaded. Then, the coefficient corresponding to another PN seed is loaded at the next M/N msec. This coefficient loading takes place for each of the remaining PN seeds and is carried out in a random order, and the coefficient is updated at each M/N msec. In addition, the timing offset as much as the time taken for loading must be given to the PN seed at each M/N msec as shown in step ST13.

Therefore, when a first user 101 transmits pilot signals, the matched filter 200 catches the signal synchronization of the first user 101. If the PN seed used by the user is identical to the first coefficient loaded from the synchronization point of time it transmits the position thereof to the corresponding demodulator 301, as shown in steps ST14 and ST15. At this time, the position is a value in which the offset from the synchronization point of time is not considered.

In addition, when second user 102 transmits pilot signals, the matched filter 200 catches the signal synchronization of the second user 102. If the PN seed used by the second user 102 is identical to the coefficient loaded at the time point of M/N msec, It outputs the position in which the offset from the synchronization point of time is considered to the corresponding demodulator 302. Here, the offset is the time taken for loading the corresponding coefficient. That is, in the case that synchronization is caught by using the coefficient loaded at the time point of M/N msec, the offset at that time becomes M/N msec. When synchronization is caught by using the coefficient loaded at the time point of 2 M/N msec, the offset at that time becomes 2 M/N msec. Thus, in the position where the synchronization is caught using the first coefficient loaded from the synchronization point of time, the offset is not considered. In this manner, the user signal synchronized in the single matched filter 200 is demodulated by the corresponding demodulator.

As broadly described herein, the apparatus and method for acquiring multi-user signal synchronization in a code division multiple access system that has many advantages. For example, coefficients are generated in a single matched filter to correspond to different PN seeds used by a plurality of users. The coefficients are loaded in a random order at each point of the coefficient updating time in one frame. It is thus possible to acquire synchronization in one frame with respect to multi-user signals using different PN seeds. Moreover, only a single matched filter is required even when the number of users is increased. Construction of the apparatus is thereby simplified and acquiring multi-user signal synchronization is achieved within one frame time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for acquiring multi-user signal synchronization in a CDMA system, comprising:
   a plurality of CDMA transmitters, which generate pilot signals using different Pseudo Noise (PN) seeds and align the generated pilot signals to transmit them within a prescribed time from a synchronization point of time; and
   a CDMA receiver comprising a single matched filter, to acquire a synchronization of signals transmitted from the plurality of CDMA transmitters in one frame period by varying a tap coefficient at a certain interval in the frame period,
   wherein the prescribed time of alignment of the plurality of CDMA transmitters is greater than zero, and less than the difference of a dividend of a period of one frame divided by the number of CDMA transmitters minus a time taken for loading the transmitted signals to all taps included in the matched filter.

2. The apparatus of claim 1, wherein the matched filter comprises:
   a plurality of taps to delay pilot signals transmitted from the plurality of CDMA transmitters for prescribed time periods before outputting the delayed pilot signals;
   a coefficient generator to generate coefficients corresponding to the PN seeds used in the plurality of CDMA transmitters and output the same at a prescribed interval in a frame period;
   a plurality of multipliers to multiply signals outputted from the plurality of taps by corresponding coefficients outputted by the coefficient generator; and
   a summer to sum the outputs of the plurality of multipliers, wherein the summed value is a correlation value.

3. A method for acquiring multi-user signal synchronization in a CDMA receiver, comprising:
   receiving aligned pilot signals having different Pseudo Noise (PN) seeds from a plurality of CDMA transmitters, the aligned pilot signals having been transmitted from the plurality of CDMA transmitters in one frame period;
   acquiring synchronization of transmitted signals by dynamically updating a tap coefficient at a certain interval in the frame period and correlating it with the pilot signals;
   storing each of the PN seeds of the plurality of CDMA transmitters and setting a tap coefficient updating time by dividing the length of one frame into the number of CDMA transmitters;
   generating a plurality of coefficients corresponding to the plurality of stored PN seeds and loading the coefficients at a tap coefficient updating time in a random order; and
   acquiring synchronization of the transmitted signals and outputting position data in which an offset from a synchronization point of time is transferred to a corresponding demodulator, if the signal from one CDMA transmitter among signals received from the plurality of CDMA transmitters equals the loaded coefficient.

4. The method of claim 3, wherein there is no offset in the position when synchronization is acquired by using a first loaded coefficient from the synchronization point of time, and the time taken for loading the coefficient from the synchronization point of time is represented as an offset when synchronization is acquired by using coefficients other than the first loaded coefficient.

5. The method of claim 3, wherein the offset in the position is less than or equal to the length of one frame when synchronization is acquired by using the coefficient loaded at the offset from the synchronization point of time.

6. A method for acquiring multi-user signal synchronization in a CDMA system, comprising:
   storing PN seeds that are equal to PN seeds used in a plurality of CDMA transmitters;

generating a tap coefficient corresponding to the plurality of stored PN seeds and updating the tap coefficient at a prescribed time interval in a frame period; and acquiring signal synchronization of the plurality of CDMA transmitters in one frame by correlating signals from the CDMA transmitters with the updated tap coefficient, wherein the generated tap coefficient is loaded in a random order at the prescribed time interval in the frame period regardless of the order of users using the corresponding PN seed.

7. The method of claim 6, wherein the prescribed time interval in the frame period is represented as M/N msec, where the length of one frame is M msec and the number of CDMA transmitters in the plurality of CDMA transmitters is N.

8. The method of claim 6, wherein synchronization of signals of the corresponding CDMA transmitter is acquired and a position from a synchronization point of time is outputted when the signal from the CDMA transmitters transmitted at a certain time interval in the frame period is identical to the tap coefficient updated at the prescribed time interval in the frame period.

9. The method of claim 6, wherein there is no offset in the position when synchronization is acquired by using the first loaded coefficient from the synchronization point of time, and the time taken to load the coefficient from the synchronization point of time is represented as the offset when synchronization is acquired by using subsequent loaded coefficients.

10. The apparatus of claim 2, further comprising a plurality of demodulators to demodulate signals from the plurality of CDMA transmitters after being synchronized in the matched filter.

11. The method of claim 3, wherein the length of one frame is represented as M, the number of CDMA transmitters is represented as N, the tap coefficient updating time is M/N, and the offset is represented by n(M/N), when synchronization is acquired by using the coefficient loaded at the time point of n(M/N) from the synchronization time, and wherein 0<n<N.

12. The method of claim 3, wherein the aligned pilot signals are transmitted within a prescribed time from a synchronization point of time.

13. The method of claim 5, wherein the offset is equal to the product of a variable multiplied by the dividend of the period of one frame divided by the number of CDMA transmitters, when synchronization is acquired by using the coefficient loaded at a time equal to the product of the variable multiplied by the dividend of the period of one frame divided by the number of CDMA transmitters from the synchronization point of time, wherein the variable is greater than or equal to 0 and less than or equal to the number of CDMA transmitters.

14. The method of claim 3, wherein the tap coefficient corresponds to the PN seeds.

15. The method of claim 6, wherein the correlating is performed by a single matched filter.

16. An apparatus for acquiring multi-user signal synchronization in a CDMA system, comprising:

a plurality of CDMA transmitters, which generate pilot signals using different Pseudo Noise (PN) seeds; and a CDMA receiver comprising a single matched filter, to acquire a synchronization of signals transmitted from the plurality of CDMA transmitters in one frame period by varying a tap coefficient at a certain interval in the frame period, wherein the generated pilot signals are aligned such that a first one of the plurality of CDMA transmitters transmits at a first time that is offset from a beginning of a frame, a second one of the plurality of CDMA transmitters transmits at a M/N time, and a N one of the plurality of CDMA transmitters transmits at a (N−1) M/N time, where M is a time length of the frame and N is a total number of the plurality of CDMA transmitters.

17. The apparatus of claim 16, wherein the prescribed time of alignment of the plurality of CDMA transmitters is greater than zero, and less than the difference of a dividend of a period of one frame divided by the number of CDMA transmitters minus a time taken for loading the transmitted signals to the entire taps of the matched filter.

18. The apparatus of claim 16, wherein the matched filter comprises:

a plurality of taps to delay pilot signals transmitted from the plurality of CDMA transmitters for prescribed time periods before outputting the same;

a coefficient generator to generate coefficients corresponding to the PN seeds used in the plurality of CDMA transmitters and output the same at a prescribed interval in a frame period;

a plurality of multipliers to multiply signals outputted from the plurality of taps by corresponding coefficients outputted by the coefficient generator; and a summer to sum the outputs of the plurality of multipliers, wherein the summed value is a correlation value.

19. The apparatus of claim 18, further comprising a plurality of demodulators to demodulate signals from the plurality of CDMA transmitters after being synchronized in the matched filter.

* * * * *